T. W. MORRISON.
Sewing-Machine.
No. 216,339.   Patented June 10, 1879.
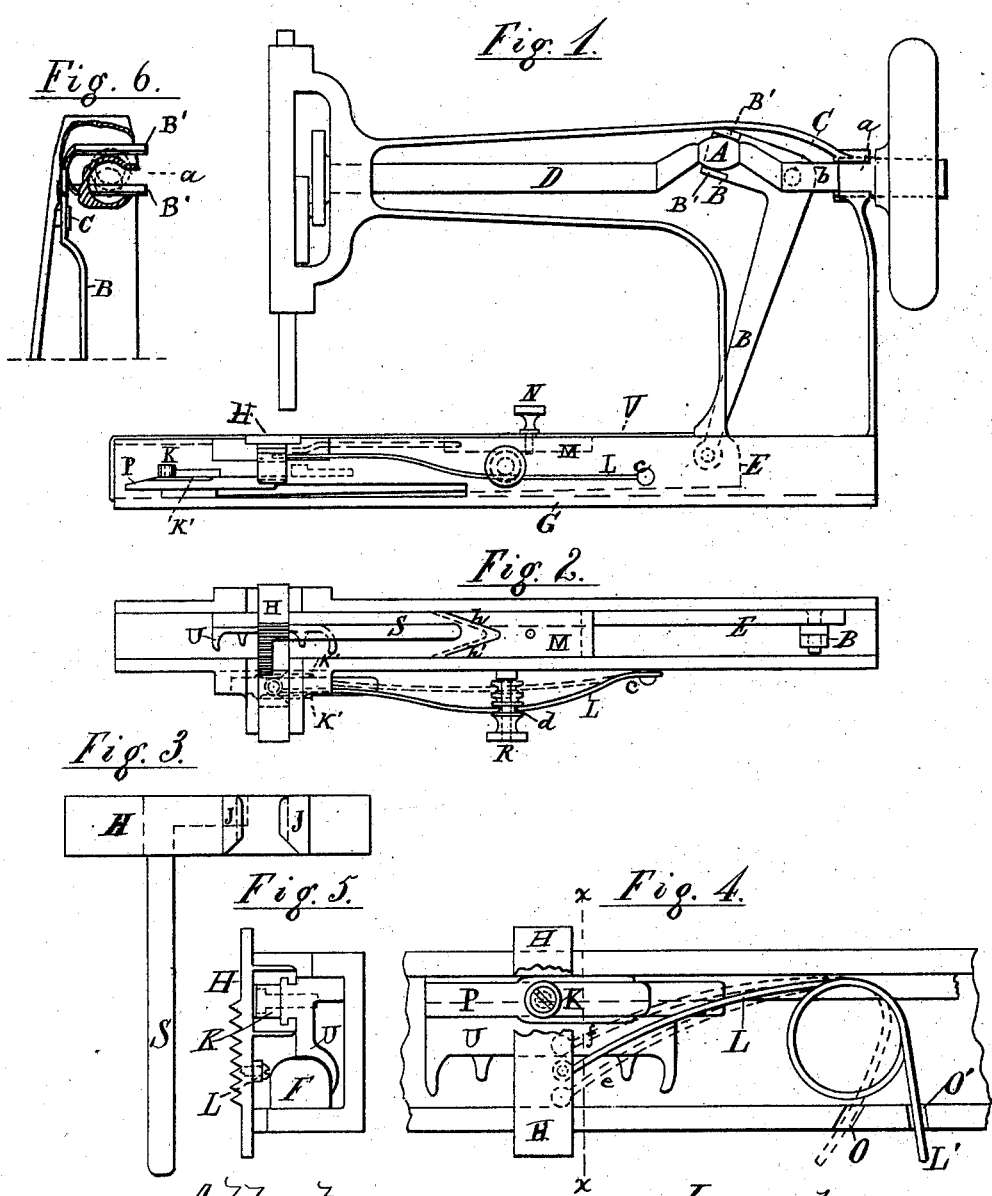

UNITED STATES PATENT OFFICE

THOMAS W. MORRISON, OF NEWARK, NEW JERSEY.

IMPROVEMENT IN SEWING-MACHINES.

Specification forming part of Letters Patent No. 216,339, dated June 10, 1879; application filed March 29, 1879.

*To all whom it may concern:*

Be it known that I, THOMAS W. MORRISON, of Newark, New Jersey, have invented certain new and useful Improvements in Sewing-Machines, of which the following is a specification.

My invention consists in certain improvements in sewing-machines, relating, first, to means for transmitting motion from the driving-shaft to the shuttle, and, secondly, to the feed-operating mechanism.

It is my object, in the first part of my invention, to obtain a simple and effective shuttle-actuating mechanism without the use of jointed connecting-rods, counter-shafts, or gearing, such as heretofore used. To this end I combine with the driving-shaft a bell-crank or elbow lever provided at one end with a laterally-projecting fork or arms, which straddle a crank on the driving-shaft, which lever is connected at its other end with the shuttle rod or carrier. The pivot of the lever is preferably alongside of and in the horizontal plane, or thereabout, of the axis of the driving-shaft, and that portion of the crank which is straddled by the fork is made convex longitudinally, so as to provide for the play requisite to permit the arms to move over it freely and without binding.

The principal feature of the second part of my invention consists in combining with the feed-bar a spring for giving it back motion, or both back and down motion, which spring is adjustable in order to cause the back motion to take place in either direction, thus reversing the feed at will without reference to the direction in which the machine runs. I also combine with the feed-bar and the spring, which is adjustable to give back motion to the feed-bar in either direction, as just specified, a feed-regulator for varying the length of stitch, which, when once set, gives the same length of stitch whether the work be fed in one direction or the other.

The nature of my invention, and the manner in which the same is or may be carried into effect, will be understood by reference to the accompanying drawings, in which—

Figure 1 is a side elevation of so much of a sewing-machine as is required to illustrate my improvements. Fig. 2 is a plan of the base or lower part with the covering-plate removed. Fig. 3 is a plan of the under side of the feed-bar detached. Fig. 4 is a plan view of a feed mechanism of modified form. Fig. 5 is a sectional view of the same on the line $x\,x$, Fig. 4, and Fig. 6 is a transverse vertical section through the upper part of the rear end of the goose-neck with the shaft removed.

In the goose-neck of the machine the driving-shaft D is arranged in any ordinary or suitable manner. This shaft is provided with a crank portion, A. I prefer to make the shaft and crank of one and the same piece.

The driving-shaft imparts movement to the needle-bar in the usual way. Its crank A is intended here to give movement to the shuttle rod or carrier. The intermediary through which the movement is transmitted is the elbow or bell crank lever B. This lever is pivoted to the frame or goose-neck at C, and I prefer that this point should be alongside of and in the horizontal plane of the axis of the driving-shaft, or thereabout. This arrangement is shown in the drawings.

The upper arm of the lever is formed or provided with a laterally-projecting fork or yoke or arms, B′, extending in a direction transverse to the shaft and straddling the crank A.

The two arms B′ touch the crank A above and below, and are of a length at least equal to the throw of the crank.

The surface of the crank A, on which the arms work, is made convex longitudinally, giving the crank a ball-like form, permitting the arms the play requisite to allow them to move over the crank freely when the shaft revolves.

The revolution of the crank consequent upon the revolution of the shaft causes, through the instrumentality of the fork or yoke B′, the elbow-lever B to oscillate upon its axis C.

The longer arm of the lever is united by a pin-and-slot connection with the shuttle-carrier U, and the latter is thus caused to reciprocate.

The shuttle-carrier U is virtually a rod having its rear end, E, attached to the elbow-lever, and supported at its opposite end, so as to slide in or on a proper bearing or on the floor G of the base of the sewing-machine frame.

One of the bearings of the driving-shaft—in this instance the rear bearing—opens into a lateral slot, $a$, in the frame, which has a width less than the diameter of the bearing. This slot extends to the outside of the frame.

A sufficient portion, $b$, of the shaft D is made of reduced size to correspond with the size of the slot, so that it may pass therethrough. The shaft can be easily put in place by introducing the reduced part $b$ into the slot leading to the bearing.

As soon as the shaft fairly enters the bearing it can be pushed forward to its proper position. This enables me to cast the shaft and its crank in one piece, together with such other appurtenances as it may be found desirable to form solidly with the shaft, and then to fit the whole into the frame readily and easily. I may construct both the front and rear shaft-bearings in this way, should it be found desirable.

I use the shuttle-carrier to give the up and forward movements to the feed-bar H, and I arrange the parts that the carrier will so act no matter in which direction the feed-movement takes place.

The feed-bar is provided on its under side with two flaring lugs, J, between which passes the device which acts on one or the other of the lugs in order to give positive longitudinal motion to the feed-bar. This device, in the present instance, is a friction-roller, K, placed on the shuttle-carrier at the summit of the bevel P of the carrier. The bevel passes under the feed-bar on the return motion of the shuttle and lifts the feed, after which the friction-roller strikes against the inclined face of that one of the lugs which may, by the spring hereinafter described, be pushed across its path, thus giving the positive longitudinal feed-movement.

The carrier is widened at the point K′, this widened part forming a bridge which upholds the feed-bar against the work until the latter has been pierced by the descending needle. The narrower part of the carrier that follows permits the feed-bar to drop, after which it is returned to its first position by a spring.

When the carrier moves in the direction to pass the shuttle through the needle-thread loop the bridge-piece is permitted to pass the feed without actuating it by longitudinal grooves formed in the inner face of the lugs J, said grooves being of a size to permit the free passage of the widened bridge-like part of the carrier.

The lugs J are counterparts of one another. If one of them be brought in the path of the carrier, the feed will be in one direction. If the other be brought in the path of the carrier, the feed will be in the reverse direction.

The device through whose instrumentality the feed-bar is thus moved is the spring L, which is used to give the back and down motions to the feed-bar. This spring is attached at one end, $c$, to the machine-frame. At its opposite end it is attached to the feed-bar, and at a point intermediate between the two it engages an adjuster, R. The spring, in the present instance, is a highly-tempered steel wire, which extends straight between the points to which its respective ends are attached. The adjuster is a thumb-screw, which can be screwed into and out from the frame, and is provided with a deep peripheral groove, $d$, in its enlarged head or outer end, which is entered by the spring, as shown. By moving the adjuster out the spring will be caused to move outwardly at its center, and consequently its tendency in that position will be to draw the feed in a corresponding direction. When, on the contrary, the adjuster is screwed inwardly to the other side of the position which the spring normally occupies, it will draw the spring over into this position also, and consequently will cause the energy or stress of the spring to exert itself in a direction the reverse of that in which it acted before. In other words, according as the adjuster draws the center part of the spring to one side or the other of the position it would normally occupy when uninfluenced by extraneous agencies, so will the stress of the spring be. Thus, by a slight movement of the adjuster, I can reverse the feed without reference to the direction in which the machine runs, for the moment I reverse the stress of the spring I bring in the path of the carrier that one of the lugs J which before was out of action.

The spring, in addition to the functions above stated, at all times tends to depress or lower the feed, as in other feed-motions where a spring is employed to give the back and down movements.

Various means may be employed to reverse the spring, and the form and arrangement of the spring itself may be varied considerably. I may, for instance, employ the arrangement shown in Figs. 4 and 5, where I employ a coil-spring. The upper end of the coil L′ extends through a slot in the side of the base of the machine, and the coil itself extends downward, its opposite end being suitably connected with the feed-bar H, so that it will tend at all times to press it downward. At one end of the slot is the notch O, and at the other the notch O′. When the end L′ is placed in notch O′ the stress of the opposite end of the spring would be in the direction indicated by the lower dotted line, $e$. The upper dotted line, $f$, shows the direction of the stress of the spring when the end L is changed from O′ to O.

With a reversible feed of this character it is desirable to have a stitch-regulator which will act whether the feed be in one direction or the other, and which, when once set, will give the same length of stitch in either direction without requiring any change.

One form of regulator having these characteristics is shown in the drawings. It consists of a jawed or V plate, M, between whose slanting or inclined jaws $h\ h'$ enters a finger or projection, S, attached to and moving with the feed. If the feed were not a reversible feed, but one jaw would be needed. The two jaws are counterparts of one another, and only one is in action at a time. The one that is in action serves to limit the extent of back motion of the feed, this being determined by the extent to which the finger enters between the jaws. The farther it enters the shorter will be the stitch.

When the feed is in one direction, the one jaw—for instance, $h$—limits the back movement of the feed-bar. The moment the feed is reversed the jaw $h'$ serves the same purpose, and will act to give the same length of stitch.

The regulator may be moved in various ways. In this instance it is held by a set or thumb screw, N, which passes through a slot in the plate V. By means of the thumb-screw the plate can be adjusted to and from the feed, and held in any desired position of adjustment.

Having described my invention, what I claim, and desire to secure by Letters Patent, is—

1. The combination, with the driving-shaft provided with a crank, of the elbow or bell-crank lever, pivoted at its angle to the machine-frame, and formed or provided with a yoke or fork projecting at about right angles to and straddling the crank on said shaft, substantially as and for the purposes set forth.

2. In combination with the driving-shaft provided with a crank and the shuttle rod or carrier, the intermediate pivoted elbow or bell-crank lever, provided at the one end with a yoke or fork standing at about right angles to and straddling the crank on said driving-shaft, and connected at the opposite end with the shuttle carrier or rod, substantially as set forth.

3. The angle or elbow lever, having its pivot or axis of oscillation in the horizontal plane of the axis of the driving-shaft, or thereabout, and provided with a laterally-projecting yoke or fork, in combination with the rotary crank driving-shaft and the reciprocating shuttle rod or carrier, substantially as set forth.

4. The feed-bar and mechanism for imparting thereto positive up and forward feed-motions in either direction, in combination with a spring for imparting the back, or both back and down, movements, and an adjuster for reversing the stress of the spring, substantially as set forth, whereby the feed may be reversed at will without reference to or affecting the other moving parts of the machine.

5. In combination with the reversible feed-bar, its positive actuating mechanism, and the reversible spring, the stitch-regulator, arranged and operating substantially as set forth, to control by one adjustment the feed-movement in both directions, and to give the same length of stitch in either direction.

6. In combination with the driving-shaft having a reduced diameter at one or more points, as described, the frame and the shaft-bearings, communicating, one or both, with a lateral slot of less width than the diameter of the bearing, extending to the outside of the frame, and adapted to permit the introduction through it of the reduced part of the shaft into bearing substantially as and for the purposes set forth.

THOMAS W. MORRISON.

Attest:
RICHARD A. VANZANT,
WILLIAM DIXON.